United States Patent [19]
Tuttle et al.

[11] Patent Number: 4,500,096
[45] Date of Patent: Feb. 19, 1985

[54] TURBINE SHAFT SEAL ASSEMBLY

[75] Inventors: Alan H. Tuttle, Andover; James K. Leonard, Wellsville; Henry J. Dlugosz, Olean, all of N.Y.

[73] Assignee: McGraw-Edison Company, Rolling Meadows, Ill.

[21] Appl. No.: 468,348

[22] Filed: Feb. 22, 1983

[51] Int. Cl.³ .............................................. F16J 15/48
[52] U.S. Cl. ..................................................... 277/53
[58] Field of Search ................. 277/4, 53, 54, 57, 193; 308/36.1

[56]  References Cited
U.S. PATENT DOCUMENTS

| | | | |
|---|---|---|---|
| 1,076,434 | 10/1913 | Leavitt . | |
| 1,326,690 | 12/1919 | Rice . | |
| 1,855,890 | 4/1932 | Phillips . | |
| 3,503,616 | 3/1970 | Hickey | 277/4 |
| 3,565,497 | 2/1971 | Miller | 308/36.1 |
| 3,920,251 | 11/1975 | Remberg | 277/53 |
| 3,971,563 | 7/1976 | Sugimura | 277/54 |
| 4,099,727 | 7/1978 | Weiler | 277/53 |

Primary Examiner—Robert I. Smith
Attorney, Agent, or Firm—Thomas G. Anderson; James A. Gabala; Hugh M. Gilroy

[57]  ABSTRACT

A three part split shaft seal assembly is disclosed which is particularly adapted for use in an overhung steam turbine. In one embodiment the assembly is located between the shaft opening of the turbine case and a horizontally split shaft bearing case. To facilitate axial insertion and removal of the assembly, the seal assembly is formed from three pairs of split ring seals. Proper axial alignment is maintained by stand-offs or dowel pins located between two of the split ring seals. In one embodiment a snap ring received within an annular groove in the turbine housing holds two of the seal rings against axial movement. In that embodiment set screws carried in one ring seal are used to seat and align two ring seals of the assembly relative to the turbine casing. A pin holds two of the ring seals against relative rotational movement. In another embodiment, a split spacer ring is used to maintain correct spacing and the third seal is used to position and hold the other two seals axially aligned to each other.

23 Claims, 7 Drawing Figures

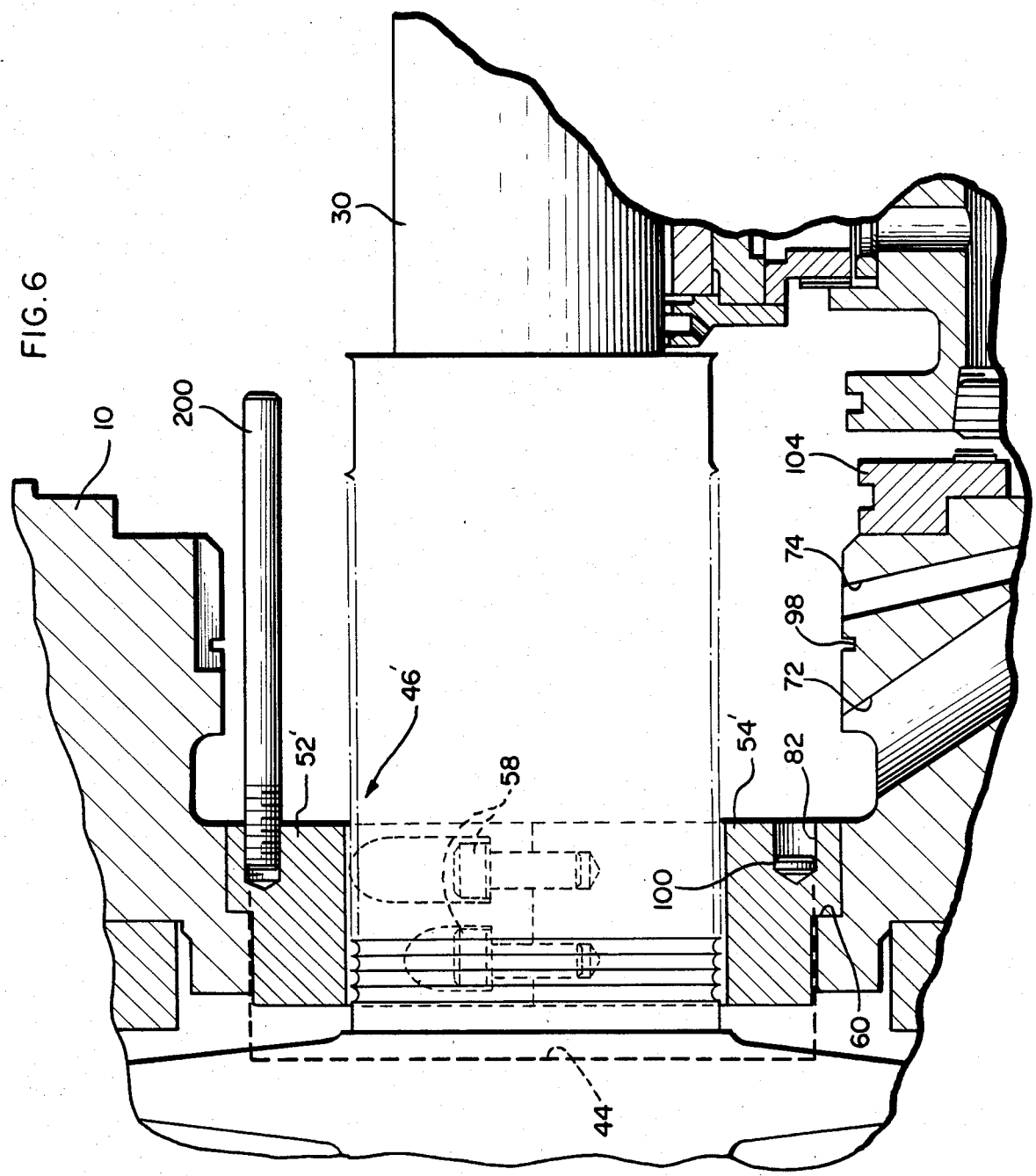

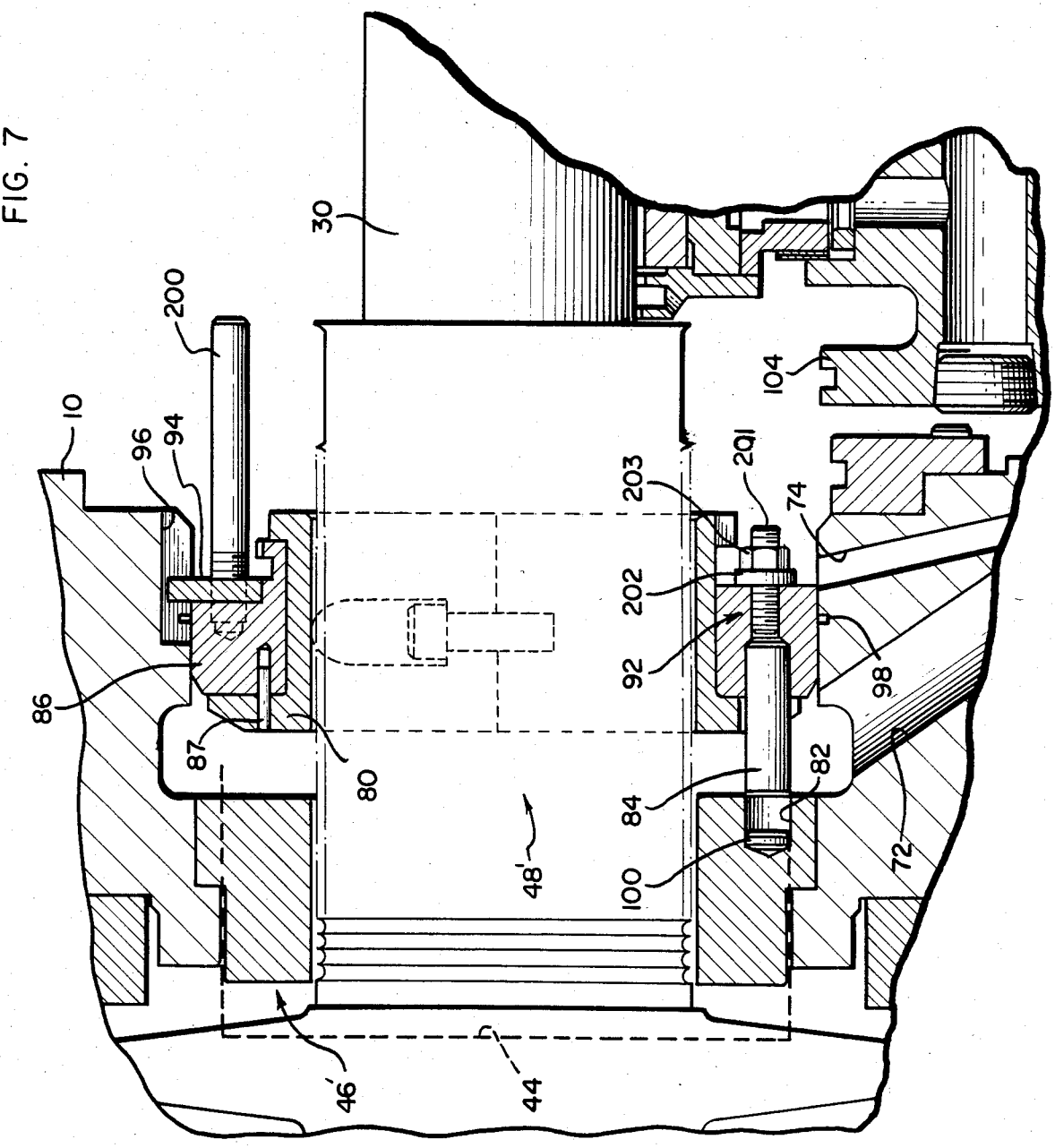

TURBINE SHAFT SEAL ASSEMBLY

FIELD OF THE INVENTION

This invention relates to a shaft seal assembly for a turbine having a rotating shaft extending from a turbine casing and, more particularly, to a split ring shaft seal assembly as used in an overhung steam turbine.

BACKGROUND OF THE INVENTION

The quantity of steam entering a steam turbine which does not pass through and across the turbine buckets and which escapes to the atmosphere reduces the efficiency of the turbine. Therefore, to the maximum extent possible, there should not be any leakage of steam from the casing of a steam turbine before that steam has produced work. One or more split rings have been used to seal the interface between a steam turbine casing and the associated shaft. U.S. Pat. No. 3,503,616 to Hickey is one example of this concept. These ring seals are commonly used within a horizontally split housing or casing to enable the seals to be removed or replaced without removing the shaft and rotor. However, the upper casing must be removed or lifted to free the seal rings.

It is also known to provide a small opening in a steam turbine case to axially insert or remove small labyrinth seal segments through a special housing recess (i.e., U.S. Pat. No. 3,920,251 to Remberg). However, after these labyrinth steam seal segments have been axially located they must be then rotated to their final position by means of a special installation fixtures or tools. These methods are needlessly time consuming and inefficient. More importantly, the cost of modifying the turbine casing to receive these seal segments is high and replacement is not easy. Those skilled in the art also know that any seal scheme that requires careful machining of the turbine case is a seal scheme that is difficult to maintain and operate. It should also be clear that, in the case of an overhung steam turbine, axial thrust, and therefore thrust bearing or balance piston losses, can be minimized or reduced by directing the steam flow through a path away from the shaft bearings. It should be equally clear that rotor stability requirements restrict the space available for the insertion of a shaft seal between the rotor and the supporting bearings. In other words, the bearings for a turbine shaft should be placed as close as possible to the first stage rotor for that steam turbine. Thus, a difficult, and certainly a non-obvious, design problem is presented which requires solution.

SUMMARY OF THE INVENTION

One object of this invention is to provide a steam seal assembly for use in an overhung steam turbine which can be easily installed or removed without having to provide the turbine case with special or difficult to manufacture turbine case recesses or surfaces and without having to remove the turbine shaft.

In keeping with this objective, access through a smooth bored shaft opening at one end of the turbine case is provided to receive a plurality of horizontally split seal rings which are assembled individually around the shaft and moved axially through the shaft opening into their correct axial position.

A further objective of the present invention is to provide a seal assembly, mounted within the shaft opening of a turbine case, comprising a first split annular seal, a second split annular seal, means of securing the first and second annular seals together against relative rotating movement and means for releasably holding at least one of the annular seals against relative axial movement within the shaft opening. In one embodiment, a plurality of dowel pins interconnect the two annular seals to secure them against relative rotary movement and to space them apart from each other. A snap ring received within a groove in the shaft opening, releasably holds the two annular seals against relative axial movement. A threaded assembly including a set screw is used to adjustably press two seals away from each other and against a shoulder within the shaft opening, on one hand, and the snap ring, on the other hand, to maintain proper axial positioning of the two seals.

Still a further object of the present invention is the provision of a seal assembly for a turbine comprising a first split seal ring, a second split seal ring with one of the first and second split seal rings defining an integrally mounted stand-off for spacing the two apart from each other, a third split seal ring, and means for mounting the third split seal ring to the turbine housing. The third split seal ring in this embodiment presses the second seal ring against the first seal ring to hold the complete assembly against axial movement. In one embodiment the third split seal ring includes an inner and outer split ring which are threadably joined together for relative axial movement and adjustment of complete assembly.

Still another object of the present invention is to provide a seal assembly for an overhung turbine where access to the shaft opening is restricted because the opening is in close proximity to the bearings for that shaft.

BRIEF DESCRIPTION OF THE DRAWINGS

Further objects, features and advantages will be made apparent and the foregoing objects, features and advantages will be described in greater detail in the following detailed description of the preferred embodiment which is given with reference to the several views of the drawing, in which:

FIGS. 6 and 7 are enlarged cross-sectional side views of one embodiment of the split seal assembly illustrating the manner in which the seal assembly is installed about the turbine shaft.

DETAILED DESCRIPTION

While invention is susceptable of embodiment in many different forms, there is shown in drawings and will herein be described in detail several specific embodiments, with the understanding that the present disclosure is to be considered an exemplication of the principals of the invention and that it is not intended to limit the invention to the specific embodiments illustrated.

COMPONENTS

Figure 1:
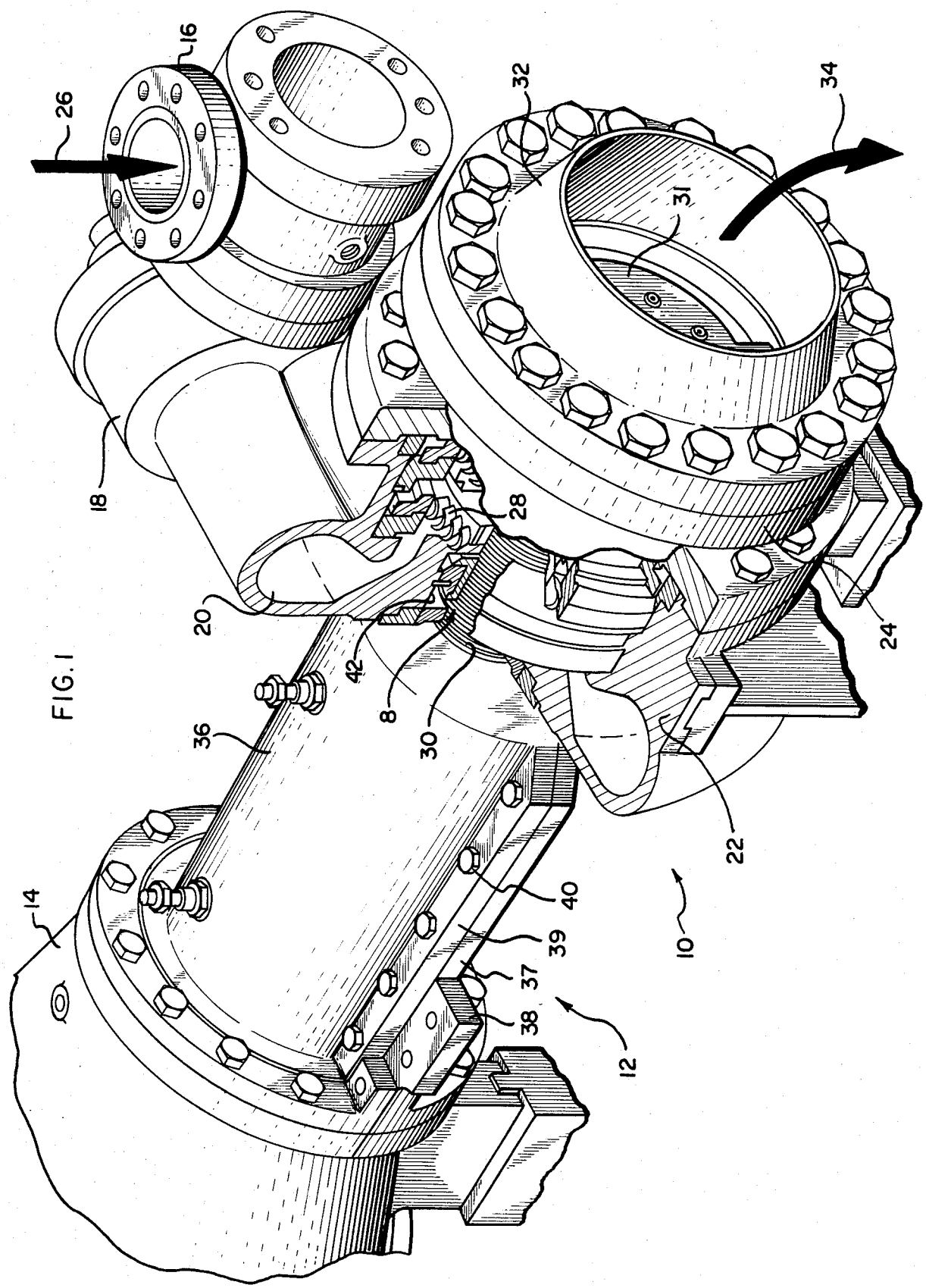
FIG. 1 is a partially cut away, perspective view of a steam turbine employing the seal assembly of the present invention.

Referring now to FIG. 1, an overhung steam turbine employing the split seal assembly 8 of the present invention is seen to include a non-horizontally split turbine casing or case 10, a horizonally split bearing case 12, usually in close proximity to the turbine case, and a transmission 14. The turbine case 10 includes a steam inlet 16, a governor valve case 18, an annular steam chest 20, and a rotor housing 22. A diffuser and exhaust outlet 31 is secured to one end of the turbine case 10. Pressurized steam enters the inlet 16 (in the direction indicated by arrow 26) and then passes through a set of rotor vanes 28 to impart rotational movement to a shaft 30 attached thereto. The steam exhaust exits through an exhaust port 32 (in the direction indicated by arrow 34) to the associated condenser. The shaft 30 extends through the bearing case 12 and into the transmission case 14 within which a suitable reduction gear and other bearing elements are located.

The split seal assembly 8 provides a steam seal between the interior of the turbine case 10, the shaft 30, and the surrounding environment in the vicinity of the bearing case 12. The split bearing case 12 comprises two casing halves 36 and 38 which are secured together along two horizontal flanges 39 and 37 by a plurality of bolts 40. Because the turbine case 10 is not horizontally split and because it is desirable to keep the shaft bearings in close to the rotor end of the shaft, space for the seal assembly 8 is severely limited. Access to seal assembly 8 must often be obtained by removal of the upper half 36 of the split bearing case 12. Once the upper half 36 of the bearing case 12 is removed, the opening 42 to seal or shaft bore 44 (See FIGS. 5, 6 and 7) is relatively accessible.

Figure 2:
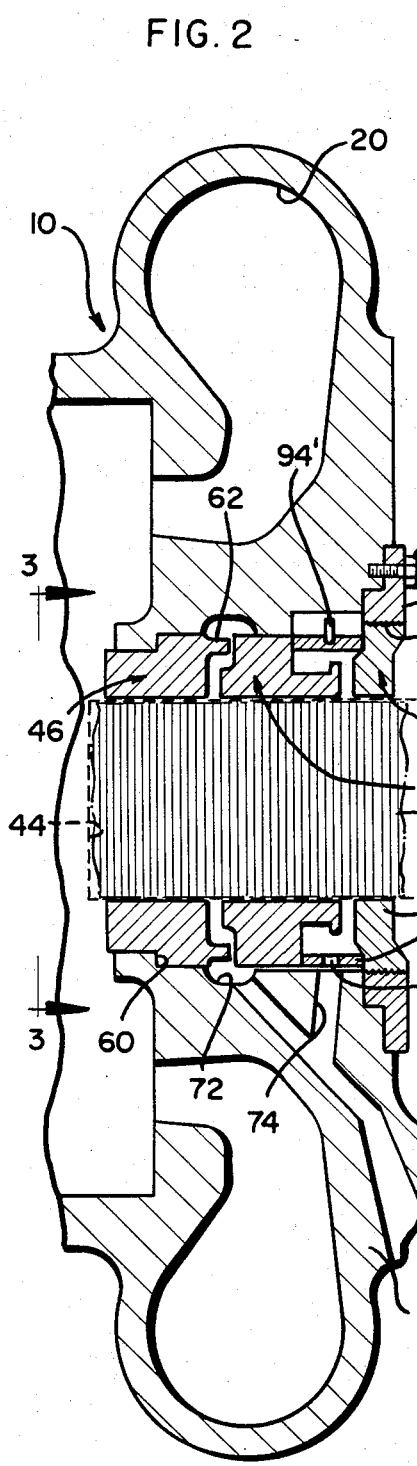
FIG. 2 is a cross sectional elevational view of a portion of the turbine shown in FIG. 1 illustrating details of one embodiment of the seal assembly.
Figure 3:
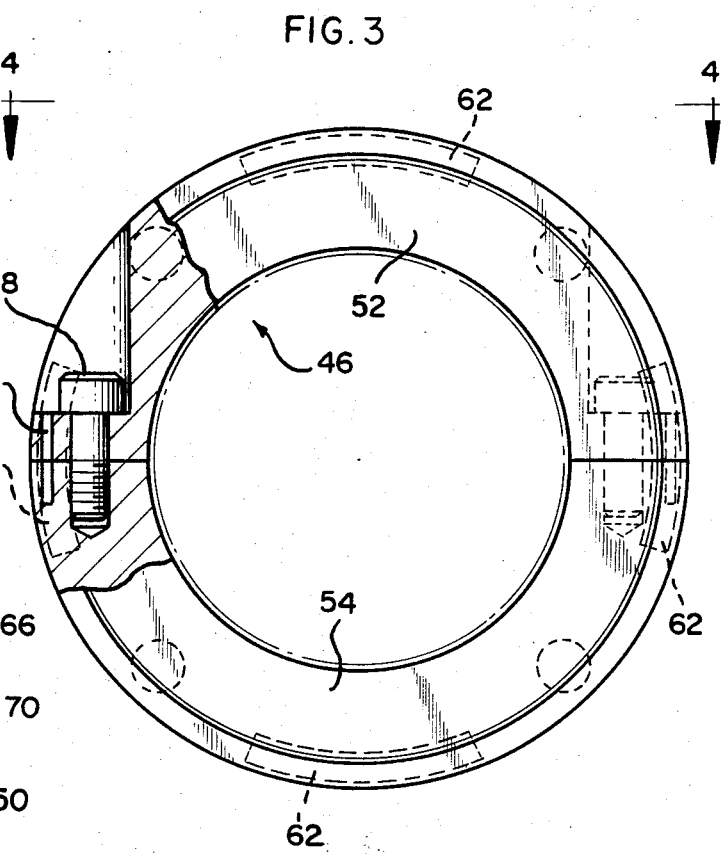
FIG. 3 is a partially cut-away end view of one of the split steam seals of FIG. 2.

Referring to FIG. 2, the split seal assembly 8 comprises a first annular split seal 46, a second annular split seal 48 and a third annular split seal 50. The first seal 46 is in the form of a horizontally split ring (as is best illustrated in FIG. 3). The two halves 52 and 54 of the first seal 46 are aligned together around the shaft 30 by vertical guide holes into which dowel pins 56 are inserted. Once aligned, the two halves 52 and 54 are held together by bolts 58. The first seal 46 is axially positioned in the turbine case 10 seal bore 44 so as to seat against a smooth annular shoulder 60 at the rotor end of the shaft opening 44.

Figure 4:
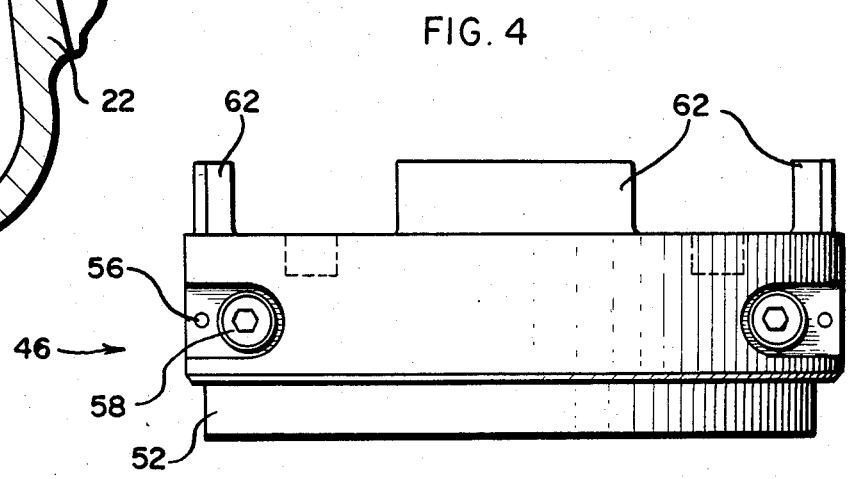
FIG. 4 is a plan view of the split seal of FIG. 3; as viewed along line 4—4 of FIG. 3.

The second annular split seal 48 is similarly assembled around shaft 30 as the first seal 46. It is then positioned in the seal bore 44 so as to abut the first seal 46 at a spaced distance therefrom. In one embodiment four standoffs 62 are integrally mounted onto first seal 46, (as is best seen in FIG. 4). These stand-offs 62 project toward the second seal 48 or away from the turbine rotors.

The third annular split seal 50 comprises two concentric split annular portions: an outer ring 66 and an inner ring 68. The outer ring 66 is connected by bolts 69 to the turbine case 10. The inner seal 68 is secured to outer ring 66 in this embodiment by threads 70 (preferably Unified National bearing threads of about 11.5 threads per inch for an OD of 7 inches). One advantage of using a threaded connection between the inner ring 68 and the outer ring 66 is that the two can be axially adjusted relative to each other to control the alignment of the other parts of the seal assembly 8. Alternatively, the outer ring 66 is connected or joined to inner seal ring 68 by a tongue and groove joint. An annular split spacer ring 64 is positioned in the shaft bore 44 between the second seal 48 and the third seal 50. The inner seal ring 68, when in position, presses against spacer ring 64 which, in turn, presses against second seal 48. The second seal 48 then presses against stand-offs 62, and first seal 46 is pressed against annular seat 60 of the turbine case 10.

Between the first seal 46 and the second seal 48, a gland exhaust opening 72 is provided in the turbine case 10. Similarly, a gland exhaust duct 74 is provided between the second seal 48 and the third annular seal 50 (an opening 51 in the spacer ring 64 allows flow from the shaft-seal assembly 8 interface and a roll pin 94' aligns the opening 51 with the exhaust duct 74).

Figure 5:
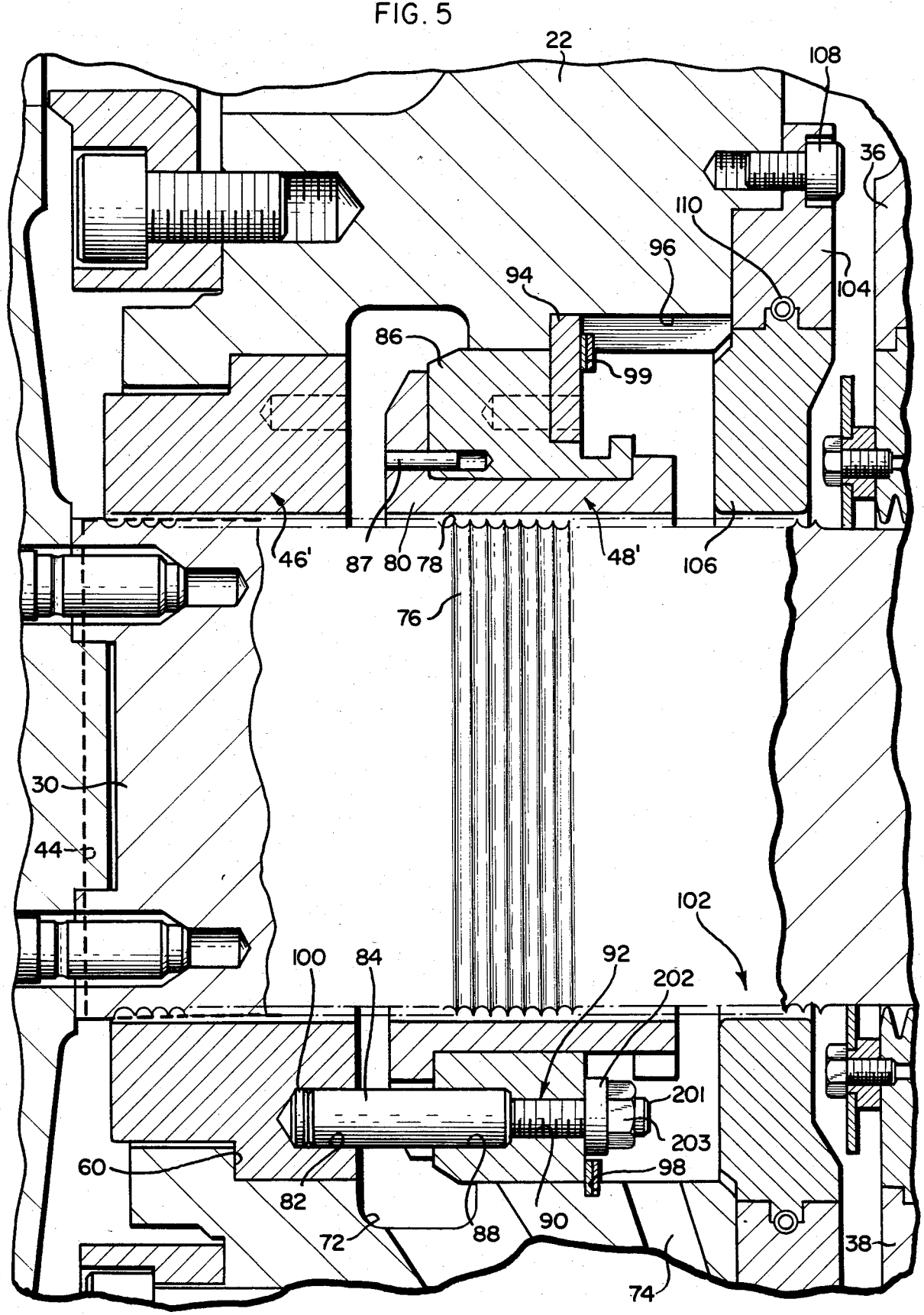
FIG. 5 is an enlarged cross sectional elevational view of another embodiment of the seal assembly.

As is best seen in FIG. 5, the seals have a relatively smooth surface in close relation to the exterior surface of the shaft 30. The shaft 30 defines a plurality of grooves 76 each separated by blunted ridges 78 (about 0.001 inch tips with a 0.010 clearance space). The tortuous path provided by this seal arrangement reduces the velocity of the steam which can then be removed through the gland exhausts ducts 72 and 74. In one embodiment it was arbitrarily decided that a median efficiency penalty of 1 percentage point would be acceptable from that portion of the steam entering the turbine which exits out of the shaft seal. Once the shaft diameter, seal clearance, tooth geometry, and flow capacity (i.e., 1 percent drop in efficiency) are defined, the number of labyrinth points can be determined. The resulting seal configuration had a 110 mm diameter and 15 points in a 45 mm length. Effectively this is the number of labyrinth points before the first leak off (which is assumed to return flow to the exhaust steam). Any additional space available will accommodate as many labyrinth points as possible to minimize the flow lost to the gland exhaust system in high exhaust pressure applications.

An alternative embodiment of split seal assembly 8 is shown in FIG. 5. In this embodiment, the first annular seal 46' is a split ring seal similar to the seal 46 shown in FIG. 3. A plurality of bores 82 (only one being shown for purpose of clarity) are defined in the first seal 46' for holding a dowel pin 84. The dowel pin functions as a spacer much as the stand-offs 62 of the prior embodiment.

The second annular seal 48' is also a split ring seal. Unlike the seal 48 shown in FIG. 3, this seal is formed from a split inner seal ring 80 and a split retainer ring 86. Both rings are keyed together by a dowel pin 87. This seal 48' has a plurality of bores 88 defined therein for receiving a dowel pin 84 and a smaller diameter, aligned bore 90 for holding a locking set screw assembly 92. A stop pin 94 carried by the second seal 86 is received by channel or notch 96 defined in the rotor housing 22. Once the stop pin 94 and dowel pin 84 have been properly received, a snap ring 99 is inserted into an annular groove 98 in rotor housing 22 to abut the second annular seal 46'. The set screw assembly 92 is then tightened to press the dowel pin 84 against a wear pad 100 seated in the first seal bore 82. This also forces the second annular seal 46' against the snap ring 99.

In this embodiment the third annular seal 102 comprises two concentric split annular portions: an outer ring 104 and an inner ring 106. The outer ring 104 is connected by bolts 108 to the rotor housing 22. The inner ring 106 is secured to the outer ring 106 by an annular tongue and groove joint 110. In a prototype seal assembly, the first seal 46' had a nominal axial thickness or length of about 2 inches, the second seal 48' had a length of about 2.5 inches, and the third seal 102 had a length of about 1 inch.

ASSEMBLY

FIGS. 6 and 7 illustrate the manner in which the seals are assembled about the turbine shaft. The first annular seal 46' is assemblied by rotating the lower half 54' about the turbine shaft 30 supporting it with the lower half of the outer ring 104. The upper half 52' of the seal is then placed over the turbine shaft 30 and aligned with the lower half 54' so that the dowel pins 56 (See FIG. 3) may be inserted. Cap screws 58' and lock washers are used to bolt the two halves together. When the cap screws 58' are tightened a complete ring is formed. An assembly pin or tool 200 is then threadably joined to the completed first seal 46' to slide it into position. Before sliding it into position, the wear pads 100 are, of course, inserted. Once the first seal 46' seats against the shoulder 60, the assembly tool 200 can be removed.

Turning now to FIG. 7, the second annular seal 48' is installed much as that of the first seal 46'. Before installing it along side the first seal 46', the spacer-dowel pins 84, the set screws 201, the washers 202 and the locknuts 203 are assembled on the retainer ring 86. The key 94 should also be installed. Preferably the set screws 201 are not in contact with the associated spacer pins 84 when the second seal 48' is assembled. Again, much as in the case of the first seal 46', the upper and lower halves of the retaining ring 86 are bolted together and doweled making sure that the associated seal ring 80 is properly retained therein. The assembly tool 200 is then threaded into the retaining ring 86 and the second seal 48' is slided into place. As the second seal 48' is being slid into position, it should be rocked to facilitate the spacer pins 84 mating with the bores 82 in the first seal 46'. Once the spacer pins 84 are properly engaged, the second seal 48' may be forced further into the seal bore 44 (See FIG. 6) until it stops in position. At this time the roll pin 94 should have passed and become clear of the groove 98. The assembly tool 200 can then be removed.

The next step is to install the snap ring 99 (preferably a SPIROLOX retaining ring). Once the snap ring 99 is installed, the set screws 201 can be driven inwardly causing the spacer pins 84 to force the wear pads 100 in the first seal 46'. The set screws 201 should be turned until the retainer ring 86 is tightly forced against the snap ring 99. Next the set screws 201 are locked in position with the locknuts 203. Before proceeding the radial clearance of the seal ring 80 relative to the shaft 30 should be checked (typically 0.010 inches/0.25 mm).

Next the lower half of the inner ring 106 is rolled into the lower half of the outer ring 104. Afterwards, the upper half of the inner ring 106 may be placed in position and the upper half of the outer ring 104 dropped down to secure the two together. Alternatively, the upper half of the outer ring 104 can be position atop the upper half of the inner ring 106 and then the two parts lowered over before securing both halfs together. In any case, the assembly is completed by bolting and doweling the outer ring 104 at the horizontal split. Finally, the upper half of the outer ring is secured to the rotor housing 22 using cap screws 108. At this time the clearance between the turbine shaft 30 and the inner seal ring of 106 should be checked (typically, 0.010 inches/0.25 mm).

While several embodiments of the invention have been shown, it should be clear that many other variations may be made thereto without departing from the scope of the invention as defined by the following claims.

What is claimed is as follows:

1. In an overhung turbine having a rotor, a rotating rotor shaft, a non-split turbine casing for housing the rotor and the overhung end of the rotor shaft, and a bearing case disposed adjacent the turbine casing for supporting the shaft, said turbine casing having a gland exhaust duct and an opening at one end through which the overhung end of the shaft extends, a seal assembly for plugging the annular zone defined by said shaft and that portion of said turbine casing in the vicinity of said opening, comprising:
   (a) a first split ring, removably carried by the turbine casing adjacent said rotor, sealingly disposed between said rotor shaft and said turbine casing with said annular zone;
   (b) a second split ring, removably carried by the turbine casing adjacent to and spaced apart from said first split ring, sealingly disposed between said rotor shaft and said turbine casing, the annular space between said first split ring and second split ring and defined by said shaft and said turbine casing being in flow communication with said gland exhaust duct; and
   (c) holding means, removably carried by said turbine casing, for releasably holding said second split ring against said first split ring and for releasably holding said first split ring and second split ring against axial movement relative to said turbine casing.

2. The seal assembly of claim 1, wherein said holding means includes a snap ring adapted to fit within a groove defined by said turbine casing.

3. The seal assembly of claim 1, wherein said first split ring defines an integral stand-off for maintaining said first split ring axially spaced apart from said second split ring.

4. The seal assembly of claim 1, further including:
   a third split ring, removably carried by said turbine casing and positioned between said second split ring and said bearing case, sealingly disposed between said turbine casing and said rotor shaft.

5. The seal assembly of claim 4, wherein the axial spacing between said bearing case and said turbine casing is generally less than the axial length of the combination of said first split ring and said second split ring.

6. The seal assembly of claim 1, further including:
   means, carried by said second split ring, for releasably holding said second split ring and said first split ring against rotational movement relative to said turbine casing.

7. The seal assembly of claim 4, wherein said third split ring is axially spaced apart from said second split ring, and wherein the annular space between said second split ring and third split ring and defined by said shaft and said turbine casing is in flow communication with said gland exhaust duct.

8. The seal assembly of claim 2, further including positioning means, carried by said second split ring, for axially and angularly positioning said first and second split ring seal assemblies relative to each other.

9. The seal assembly of claim 8, wherein said positioning means includes a dowel pin disposed in complementary bores in said first split ring and said second split ring.

10. The seal assembly of claim 9, wherein:

said positioning means includes a set screw which is disposed at one end of the complementary bore in said second split ring, and which abuts one end of said dowel pin; and wherein said turbine casing defines a circumferential shoulder at the rotor end of said annular zone against which said first split ring seal assembly seats, whereby driving said set screw into said second split ring causes the dowel pin to push against said first split ring to seat it against said turbine casing shoulder and to seat said second split ring against said snap ring in a spaced relationship with said first split ring.

11. The seal assembly of claim 4, wherein one of said second and third split rings comprises:
(a) an outer split ring removably carried by said turbine casing; and
(b) an inner split ring removably carried by said outer split ring and disposed between said shaft and said outer ring.

12. The seal assembly of claim 11, wherein said outer ring is removably joined to said inner ring by a tongue and groove joint.

13. In an overhung turbine having a turbine casing, a gland exhaust duct defined by said turbine casing, a rotor, and a rotor shaft extending from the interior of said turbine casing, said turbine casing and said shaft together defining an annular zone extending from said rotor and along said shaft, a seal assembly, comprising:
(a) a first split shaft seal ring disposed within said casing at the rotor end of said zone;
(b) a second split shaft seal ring disposed at a spaced distance from said first split shaft seal ring, at least one of said first and second split shaft seal rings defining a stand-off for spacing said first and second split shaft seal rings axially apart from each other with the space between said first and second split shaft seal rings being in flow communication with said gland exhaust duct;
(c) a third split shaft seal ring disposed adjacent said second split shaft seal ring;
(d) a split spacer ring disposed between said second and said third split shaft seal rings; and
(e) mounting means for mounting said third split shaft seal ring to said turbine casing such that said third split shaft seal ring presses said spacer, said second split shaft seal ring and said first split seal ring axially together and against said turbine casing.

14. The seal assembly of claim 13, wherein said third split shaft seal ring, said second split shaft seal ring, said spacer and said shaft defines an annular region in flow communication with said gland exhaust duct.

15. The seal assembly of claim 13, wherein said shaft and said first split shaft seal ring define a labyrinth seal.

16. The seal assembly of claim 13 wherein said turbine casing defines a circumferential seat for receiving said first split shaft seal ring.

17. The seal assembly of claim 13, wherein said stand-off is integrally mounted to said first split shaft seal ring.

18. The seal assembly of claim 13, wherein said mounting means includes an outer ring adapted to be bolted to said turbine casing, and wherein said third split shaft seal ring is threadably connected to said outer ring.

19. In an overhung turbine having a rotor, a rotor shaft, a turbine casing for housing said rotor and the overhung end of said rotor shaft, and a split bearing case disposed in close proximity to said turbine casing, said turbine casing defining an opening at one end through which the overhung end of said shaft extends to said bearing case and defining a gland exhaust duct in flow communication with said opening, a seal assembly, comprising:
(a) a first split ring, removably seated within said turbine casing adjacent to said rotor, sealing disposed between said rotor shaft and said casing;
(b) a second split ring, carried by said turbine casing adjacent to and spaced apart form said first split ring, sealingly disposed between said rotor shaft and said casing, the annular space between said first split ring and said second split ring being in flow communication with said gland exhaust duct;
(c) snap ring means, carried by said turbine casing, for releasably holding said second split ring seal against axial movement relative to said turbine casing;
(d) a dowel pin disposed in complementary bores between said first split ring and said second split ring; and
(e) a set screw disposed within said second split ring seal and at one end of the complementary bore defined therein so as to abut said dowel pin,
whereby driving said set screw towards said dowel pin forces said first split ring seal into engagement with said turbine casing and said second split ring seal into engagement with said snap ring means thereby keeping said first and second split rings apart from each other and fixed relative to said turbine casing.

20. The seal assembly set forth in claim 19, further including a third split ring, positioned at a spaced distance from said second split ring and adjacent said bearing casing, sealing disposed between said rotor shaft and said turbine casing, the space between said second split ring and said third split ring being in flow communication with said gland exhaust duct, said third split ring functioning to limit the axial displacement of said first and said second split in the event that said snap ring means fails thereby preventing catastrophic ejection of said first and second split rings out of said turbine casing opening and into said bearing case.

21. In an overhung turbine having a turbine casing defining a gland exhaust duct, a rotor, and a rotor shaft rotatably extending from said turbine casing, a shaft seal assembly, comprising:
(a) a first removable, horizontally split ring shaft seal seated against a shoulder defined by said turbine casing, said first split ring shaft seal having an integral stand-off disposed away from said rotor;
(b) a second removable, horizontally split ring shaft seal disposed at one of its ends against said stand-off and in sealing engagement with said shaft and said turbine casing, the axial space between said first split ring shaft seal and said second split ring shaft seal as defined by said standoff, said shaft and said turbine casing being in flow communication with said gland exhaust duct;
(c) a horizontally split spacer ring removably disposed within said turbine casing against the opposite end of said second split ring shaft seal; and
(d) a third removable, horizontally split ring shaft seal disposed against said spacer ring and in sealing engagement with said shaft and said turbine casing, said third seal, said second seal, said shaft and said spacer ring defining an annular zone in flow communication with said gland exhaust duct, said third seal having a horizontally split inner ring and a horizontally split outer ring with said inner ring being removably carried by said outer ring and in sealing engagement with said shaft and with said outer ring being carried by said turbine casing.

22. The seal assembly of claim 21, wherein said inner ring and said outer ring are threadably joined together and said inner ring abuts said spacer, whereby said first seal, said second seal and said spacer are compressed together by rotating said inner ring inwardly towards said turbine rotor.

23. The seal assembly of claim 21, wherein said rotor shaft is supported by a horizontally split bearing case, said bearing case having an upper half and a lower half and being disposed adjacent said third seal, the axial spacing between said turbine casing and said bearing case with the upper half of said bearing case removed being of an axial dimension generally equal to the axial dimension of the longest of said first seal, said second seal and said third seal.

* * * * *